Nov. 21, 1967

G. HESKESTAD 3,353,562

GUIDING FLUID AROUND A BEND

Filed April 1, 1965

INVENTOR
Gunnar Heskestad

BY

ATTORNEY

United States Patent Office 3,353,562
Patented Nov. 21, 1967

3,353,562
GUIDING FLUID AROUND A BEND
Gunnar Heskestad, East Brunswick, N.J., assignor to American Standard Inc., a corporation of Delaware
Filed Apr. 1, 1965, Ser. No. 444,636
18 Claims. (Cl. 138—39)

ABSTRACT OF THE DISCLOSURE

A conduit having an inlet and an outlet positioned at an angle of ninety degrees with respect to each other is provided. A slit is provided along the junction of the inner walls of the outlet and the inlet. A suction-creating device is connected to the slit to deflect a fluid passing thereover thereby to decrease the separation between the inner wall of the conduit and the fluid and to increase the efficiency of the flow of the fluid through the conduit.

---

This invention pertains to guiding fluid in a conduit around a bend and more particularly to guiding a fluid in a conduit having a bend or elbow with a zero-radius of curvature.

There are many instances where it is necessary to move fluid such as gases or air from one region to another such as exhausting gases from a confined region or supplying conditioned air to enclosed living spaces. Generally, the fluids are moved through ductwork or conduits. In laying out the ductwork it often occurs that the ductwork must follow preassigned paths. In following these paths, the conduits of the ductwork must change direction. Any sharp change in direction introduces turbulences in the fluid flow. Such turbulences introduce energy losses in the flowing fluid which result in the heating of the fluid and a drop in pressure.

In order to minimize these turbulences, elbow bends having a large radius of curvature are employed. Although, such bends are adequate for many applications they take up considerable space. Quite often space requirement demands bends with a zero-radius of curvature. In such a case, it is necessary to incorporate guide vanes within the conduit in the region of the bend. Such vanes add to the expense of the ductwork.

It is, accordingly, a general object of the invention to provide an improved method of guiding a fluid around a discontinuous bend.

It is another object of the invention to minimize the turbulence in fluid being guided around a zero-radius bend.

It is a further object of the invention to provide an angled conduit for guiding a fluid around a zero-radius bend with minimum turbulence.

It is a still further object of the invention to provide a right-angled elbow conduit which minimizes fluid turbulences without the aid of the presently utilized guide vanes.

Briefly, the invention contemplates guiding a fluid around a discontinuous bend in a conduit by applying suction along the discontinuity in the conduit wall nearest the center of curvature of the bend.

According to other aspects of the invention there is contemplated a fluid conduit with a zero-radius bend having an opening at the bend, and applying suction to the opening.

Other objects, features and advantages of the various aspects of the invention will be apparent from the following detailed description when read with the accompanying drawing which shows, by way of example and not limitation, apparatus for practicing the invention.

Figure 1:
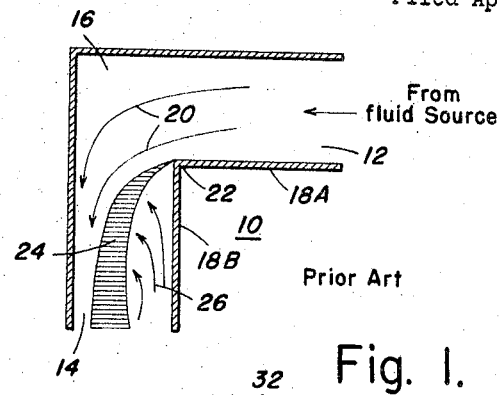
FIG. 1 is a longitudinal sectional view of a prior art conduit with a zero-radius bend including fluid streamlines to show the usual generation of turbulences resulting from an unmodified zero-radius bend.

Referring to FIG. 1, there is shown a prior art conduit 10 of rectangular cross section. Conduit 10 has an inlet portion 12 and an outlet portion 14. The portions are connected by a discontinuity region 16 in the form of a zero-radius bend. In particular, the inside wall 18, i.e., the wall closest to the center of curvature of the bend has a right angle bend or zero-radius of curvature. When fluid from a source (not shown) enters inlet portion 12 it flows along streamline 20 through the outlet portion 14 and exits therefrom. However, the upstream flow separates from inside wall 18A at the edge 22 of the discontinuity. A turbulent mixing layer 24 and a reverse entrainment flow 26 is formed. The turbulent mixing layer 24 linearly spreads along an arc until it re-attaches to the inner wall 18B of the outlet portion several duct widths downstream. At the point of re-attachment and beyond, the entire flow has been consumed by the mixing layer. The resulting flow is highly turbulent and suffers high energy losses. Heretofore, guide vanes were employed to minimize the turbulence. However, in accordance with the invention the application of suction along the edge of the discontinuity can more effectively minimize the turbulence.

Figure 2:
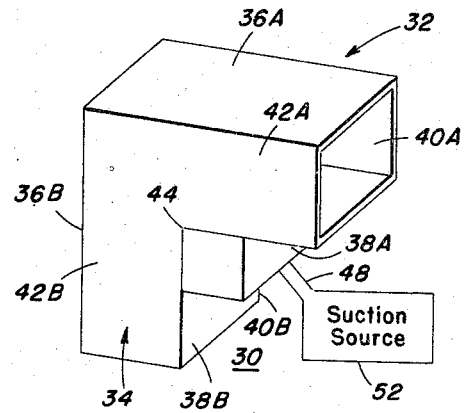
FIG. 2 is a perspective view of a conduit having a discontinuous (right-angle) bend of zero-radius with suction applied at the discontinuity in accordance with the invention.
Figure 3:
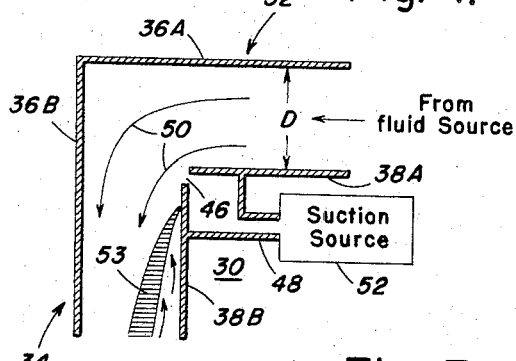
FIG. 3 is a longitudinal sectional view of the conduit of FIG. 2 to show that the discontinuity is provided with a transverse slit connected to a source of suction.

Accordingly, FIGS. 2 and 3 show an angled conduit 30 similar to conduit 10 of FIG. 1, but incorporating means for practicing the invention. Conduit 30 includes an inlet portion 32 and an outlet portion 34. Conduit 30 includes: an outside wall having regions 36A and 36B associated with the portions 32 and 34 respectively; an inside wall having regions 38A and 38B associated with the portions 32 and 34 respectively; and side walls having regions 40A and 40B, and 42A and 42B associated with inlet portion 32 and outlet portion 34. The walls are planar and define an elbow-shaped conduit of rectangular cross-section. Furthermore, the regions 38A and 38B extend from a zero-radius bend forming a channel discontinuity in the region 44. Along this discontinuity is an opening preferably in the form of a transverse slit 46 which communicates with a chamber. Tubing 48 connects the chamber to a source of suction 52.

When suction is applied to slit 46 while fluid passes through conduit 30 the nature of the fluid flow downstream of the discontinuity region 44 is considerably modified. In fact, the fluid smoothly flows around the zero-radius bend and the turbulence of the fluid in outlet portion 34 is considerably minimized. More particularly, the separation of the flow from the inside wall 38 which normally occurs at the zero-radius bend is either eliminated or delayed until the stream flows along the inside wall region 38B. The particular result depends on the geometry of slit 46 and the pressure field encountered by the flow.

In general, fluid enters the inlet portion 32 from a source (not shown) and flows in the general direction of stream lines 50 around the discontinuous bend. If there is a turbulent mixing layer 53, it will be less pronounced and start downstream of the slit 46. In other words, the effect of the edge suction through slit 46, where the plane of the slit 46 is inclined to the upstream region 38A of the inside wall 38 is to draw the mixing layer 53 to the downstream region 38B of inside wall 38.

Figure 4:
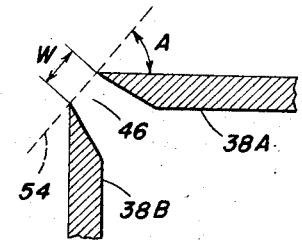
FIG. 4 is a detailed sectional view of the slit of FIG. 3.
Figure 5:
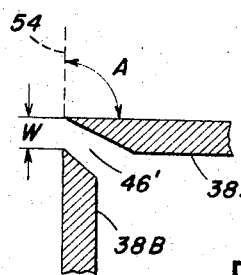
FIG. 5 is a detailed sectional view of a specific embodiment of the slit of FIG. 3.

The amount of drawing is dependent on the slit geometry. In particular, the effect is more pronounced as the angle A (FIG. 4) between the plane 54 of the slit 46 and the upstream region 38A of inside wall 38 increases. In fact, best results are obtained when angle A is ninety degrees, i.e., when plane 54 is parallel to downstream region 38B of the inside wall (see FIG. 5).

The slit width W also influences the effect. In fact, good results are obtained when the slit width W is greater than two-one-hundredths of the channel height (the distance between regions 36A and 38A of outside wall 36 and inside wall 38).

Finally, the suction rate has an influence on the effect. Generally, the greater the suction rate, the more pronounced the bending of the stream.

In a specific case, where the bend was ninety degrees there was no turbulent layer separation when the plane of the slit was parallel to the downstream region of the inside wall 38 (angle A equaled ninety degrees), slit width W was greater than two-one-hundredths of the channel height D, and the suction rate was at least three percent of the fluid flow rate in the conduit.

Figure 6:
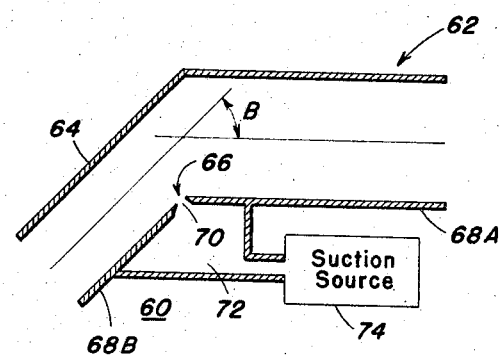
FIG. 6 is a longitudinal sectional view of an alternate embodiment of the invention wherein the bend in the conduit is other than a right angle.
Figure 7:
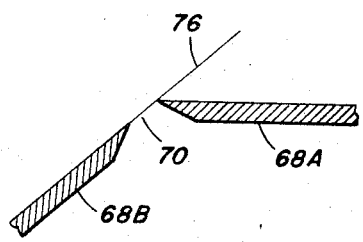
FIG. 7 is a detailed sectional view of the slit employed by the conduit of FIG. 6.

Although conduit 30 is a right-angled conduit, the same effect can be obtained with a conduit having an inlet portion 62 making an angle B (FIG. 6) with an outlet portion 64. Angle B can range from zero up to one hundred and eighty degrees. Of course, at the zero-radius bend region 66 in the inside wall 68 there is provided a transverse slit 70 which receives suction from suction source 74 via chamber 72 communicating with slit 70. The criteria for the geometry of slit 70 is similar to that given for slit 46. In particular, best results are obtained when the plane 76 (FIG. 7) of slit 70 is parallel to the downstream region 68B of the inside wall.

There has thus been shown an improved method of guiding a fluid around a zero-radius bend in a conduit. When suction is applied along the edge of the zero-radius bend discontinuity in the inside wall of the conduit fluid is smoothly drawn around the bend and little or no turbulence is introduced in the fluid flowing downstream of the bend.

While only a limited number of embodiments of the invention have been shown and described in detail, there will now be obvious to those skilled in the art many modifications and variations satisfying many or all of the objects of the invention, but which do not depart from the spirit thereof as defined in the appended claims.

What is claimed is:

1. The method of guiding a fluid around a sharply defined discontinuous bend in a conduit comprising the step of applying a substantial rate of suction through a substantially continuous transverse slit along the discontinuity in the conduit wall nearest the center of curvature of the bend, to substantially reduce turbulence due to the flow of fluid through the conduit.

2. The method of minimizing the turbulence in a fluid flowing in a substantially rectangular conduit having at least an inner wall having a zero-radius bend by applying suction through a substantially continuous transverse slit along the radii of the bend to deflect the fluid by an amount which is proportional to the suction rate.

3. The method of minimizing the turbulence in a fluid flowing in a conduit having at least an inner wall having a zero-radius bend by applying suction along the bend at a rate of substantially three percent of the rate of flow of the fluid upstream of the zero-radius bend.

4. Fluid channeling apparatus comprising an inlet conduit including an inside wall, an outside wall and first and second side walls, an outlet conduit including an inside wall, an outside wall and first and second side walls, said conduits being joined together at corresponding walls to form a zero-radius bend, a slit being provided along the junction of the inside walls of said inlet and outlet conduits, and means for applying suction to said slit, and controlling the suction rate so as to vary proportionately the angle of deflection of fluid traversing said apparatus.

5. Fluid channeling apparatus comprising an inlet conduit including an inside wall, an outside wall and first and second side walls, an outlet conduit including an inside wall, an outside wall and first and second side walls, said conduits being joined together at corresponding walls to form a zero-radius bend, a slit being provided along the junction of the inside walls of said inlet and outlet conduits, the plane of said slit being parallel to the plane of the inside wall of said outlet conduit, and means for applying suction to said slit.

6. An angled conduit comprising at least a planar inside wall and an outside wall means, said conduit being longitudinally divided into an inlet portion and an adjacent outlet portion, said planar inside wall, at the junction of said inlet and outlet portions, having a zero-radius bend so that fluid flowing from said inlet portion to said outlet portion changes direction of flow, said planar inside wall being provided with an opening in the form of a continuous transverse slit positioned so as to be substantially coincident with said zero-radius bend, and means for applying suction to said opening, of sufficient magnitude so as to diminish energy loss and turbulence due to the flow of said fluid.

7. An angled conduit comprising at least a planar inside wall and an outside wall means, said conduit being longitudinally divided into an inlet portion and an adjacent outlet portion, said planar inside wall, at the junction of said inlet and outlet portions, having a zero-radius bend so that fluid flowing from said inlet portion to said outlet portion changes direction of flow, said planar inside wall being provided with a sharply defined transverse slit along said zero-radius bend, and means for applying a substantial amount of suction to said transverse slit.

8. An angled conduit comprising at least a planar inside wall and an outside wall means, said conduit being longitudinally divided into an inlet portion and an adjacent outlet portion, said planar inside wall, at the junction of said inlet and outlet portions, having a zero-radius bend so that fluid flowing from said inlet portion to said outlet portion changes direction of flow, said planar inside wall being provided with a transverse slit along said zero-radius bend, the plane of said transverse slit being parallel to the plane of the portion of said planar inside wall included in the outlet portion of said conduit, and means for applying suction to said transverse slit.

9. A right angled conduit comprising at least a planar inside wall and an outside wall means, said conduit being longitudinally divided into an inlet portion and an adjacent outlet portion at a right angle to said inlet portion, said planar inside wall, at the junction of said inlet and outlet portions, having a ninety degree, zero-radius bend, said planar inside wall being provided with at least one opening in the form of a continuous transverse slit positioned so as to be substantially coincident with said zero-radius bend, and means for guiding the path of fluid flow through the conduit by applying a substantial rate of suction to said opening.

10. A right angled conduit comprising at least a planar inside wall and an outside wall means, said conduit being longitudinally divided into an inlet portion and an adjacent outlet portion at a right angle to said inlet portion, said planar inside wall, at the junction of said inlet and outlet portions, having a ninety degree, zero-radius bend, said planar inside wall being provided with a transverse slit along said zero-radius bend and means for applying suction to said transverse slit.

11. A right angled conduit comprising at least a planar inside wall and an outside wall means, said conduit being longitudinally divided into an inlet portion and an adjacent outlet portion at a right angle to said inlet portion, said planar inside wall, at the junction of said inlet and outlet portions, having a ninety degree, zero-radius bend, said planar inside wall being provided with a transverse slit along said zero-radius bend, the plane of said transverse slit being parallel to the plane of the portion of said planar inside wall included in the outlet portion of said conduit, and means for applying suction to said transverse slit.

12. An angled conduit of rectangular cross-section comprising a planar inside wall, a planar outside wall, and first and second side walls, said conduit being longitudinally divided into an inlet portion and an outlet portion angularly extending rfom said inlet portion by a predetermined angular discontinuity, said planar inside wall being provided with at least one opening at said discontinuity, said opening comprising a continuous transverse slit, and means for reducing the energy loss of fluid traversing the conduit by applying suction to said opening.

13. An angled conduit of rectangular cross-section comprising a planar inside wall, a planar outside wall, and first and second side walls, said conduit being longitudinally divided into an inlet portion and an outlet portion angularly extending from said inlet portion by a predetermined angular discontinuity, said planar inside wall being provided with at least one transverse slit at said discontinuity, and means for applying suction to said transverse slit and controlling the rate of suction so as to proportionately modify the path of fluid flow through said conduit.

14. An angled conduit of rectangular cross-section comprising a planar inside wall, a planar outside wall, and first and second side walls, said conduit being longitudinally divided into an inlet portion and an outlet portion angularly extending from said inlet portion by a predetermined angular discontinuity, said planar inside wall being provided with at least one transverse slit extending between said side walls at said discontinuity, and means for applying suction to said transverse slit.

15. An angled conduit of rectangular cross-section comprising a planar inside wall, a planar outside wall, and first and second side walls, said conduit being longitudinally divided into an inlet portion and an outlet portion angularly extending from said inlet portion, said planar inside wall, at the juncton of said inlet and outlet portions, having a zero-radius bend, said planar inside wall being provided with at least one transverse slit at said bend, and means for applying suction to said opening.

16. An angled conduit of rectangular cross-section comprising a planar inside wall, a planar outside wall, and first and second side walls, said conduit being longitudinally divided into an inlet portion and an outlet portion right angularly extending from said inlet portion, said planar inside wall, at the junction of said inlet and outlet portions having a zero to one hundred and eighty degree bend, said planar inside wall being provided with a transverse slit extending along said bend, the plane of said slit being parallel to the portion of said planar inside wall included in said outlet portion, and means for applying suction to said transverse slit.

17. A right angled conduit of rectangular cross-section comprising a planar inside wall, a planar outside wall, and first and second side walls, said conduit being longitudinally divided into an inlet portion and an outlet portion right angularly extending from said inlet portion, said planar inside wall, at the junction of said inlet and outlet portions having a ninety degree, zero-radius bend, said planar inside wall being provided with a transverse slit extending along said zero-radius bend, the width of said transverse slit being substantially two one-hundredths of the distance between said planar inside wall and said planar outside wall of said inlet portion, and means for applying suction to said transverse slit.

18. A right angled conduit of rectangular cross-section comprising a planar inside wall, a planar outside wall, and first and second side walls, said conduit being longitudinally divided into an inlet portion and an outlet portion right angularly extending from said inlet portion, said planar inside wall, at the junction of said inlet and outlet portions having a ninety degree, zero-radius bend, said planar inside wall being provided with a transverse slit extending along said zero-radius bend, the plane of said slit being parallel to the portion of said planar inside wall included in said outlet portion, the width of said transverse slit being substantially two one-hundredths of the distance between said planar inside wall and said planar outside wall of said inlet portion and means for applying suction to said transverse slit at a rate of substantially three percent of the rate of flow of fluid in said conduit.

References Cited

UNITED STATES PATENTS

| | | | |
|---|---|---|---|
| 2,788,719 | 4/1957 | Bennett | 138—37 X |
| 2,841,182 | 7/1958 | Scala | 137—81.5 X |
| 3,212,515 | 10/1965 | Zisfein et al. | 137—81.5 |
| 3,216,455 | 11/1965 | Cornell et al. | 138—39 |

LAVERNE D. GEIGER, *Primary Examiner.*

C. S. HOUCK, *Assistant Examiner.*